(12) United States Patent
Gesquiere et al.

US008250567B2

(10) Patent No.: US 8,250,567 B2
(45) Date of Patent: Aug. 21, 2012

(54) ROBUST FIRMWARE UPGRADE IN A NETWORK TERMINAL

(75) Inventors: Lieven Gesquiere, Bornem (BE); Dmitry Adamushka, Antwerp (BE); Ronald Vanschoren, Heverlee (BE)

(73) Assignee: Thomson Licensing, Boulogne-Billancourt (FR)

( * ) Notice: Subject to any disclaimer, the term of this patent is extended or adjusted under 35 U.S.C. 154(b) by 488 days.

(21) Appl. No.: 12/451,517

(22) PCT Filed: May 20, 2008

(86) PCT No.: PCT/EP2008/056190
§ 371 (c)(1),
(2), (4) Date: Nov. 16, 2009

(87) PCT Pub. No.: WO2008/142079
PCT Pub. Date: Nov. 27, 2008

(65) Prior Publication Data
US 2010/0122246 A1    May 13, 2010

(30) Foreign Application Priority Data

May 21, 2007    (EP) .................................... 07447033

(51) Int. Cl.
*G06F 9/44*        (2006.01)
*G06F 15/177*     (2006.01)

(52) U.S. Cl. ........ 717/173; 717/168; 717/171; 717/172; 713/1; 713/2

(58) Field of Classification Search .......... 717/168–178; 713/1, 2
See application file for complete search history.

(56) References Cited

U.S. PATENT DOCUMENTS 6,266,809 B1 *  7/2001  Craig et al. .................... 717/173
6,640,334 B1 * 10/2003  Rasmussen .................... 717/171
6,988,182 B2 *  1/2006  Teachman et al. .............. 712/37
7,080,245 B2 *  7/2006  Ballard et al. .................... 713/2

(Continued)

FOREIGN PATENT DOCUMENTS

WO    WO 2004/003733    1/2004

OTHER PUBLICATIONS

"Technical Report, DSL Forum TR-069, CPE WAN Management Protocol," May 2004, DSLHome-Technical Working Group, p. 1-109.*

(Continued)

*Primary Examiner* — Wei Zhen
*Assistant Examiner* — Qing Chen
(74) *Attorney, Agent, or Firm* — Robert D. Shedd; Vincent E. Duffy; Jerome G. Schaefer

(57) ABSTRACT

The present invention concerns a network terminal, and method in a broadband terminal for upgrading a firmware, said terminal comprising an interface to a network and a non volatile memory adapted to store only one version of the firmware, the firmware comprising a first firmware and a second firmware, the method comprising, at the terminal, the step of erasing the first firmware from the non volatile memory, downloading a rescue firmware to the non volatile memory from a server located on the network, the rescue firmware being adapted to allow the terminal to download the firmware from the server, rebooting the terminal with the second firmware and the rescue firmware, downloading a new version of the first and second firmware from the server to the non volatile memory, erasing the rescue firmware from the non volatile memory, and rebooting the terminal with the new version of the first and second firmware.

8 Claims, 5 Drawing Sheets

U.S. PATENT DOCUMENTS

| | | | |
|---|---|---|---|
| 7,093,244 B2 * | 8/2006 | Lajoie et al. | 717/168 |
| 7,127,579 B2 * | 10/2006 | Zimmer et al. | 711/163 |
| 7,320,126 B2 * | 1/2008 | Chang et al. | 717/168 |
| 7,669,046 B2 * | 2/2010 | Yasuda | 713/2 |
| 7,770,166 B2 * | 8/2010 | Oh | 717/174 |
| 7,853,944 B2 * | 12/2010 | Choe | 717/173 |
| 2002/0066092 A1 * | 5/2002 | Liu | 717/168 |
| 2002/0073304 A1 * | 6/2002 | Marsh et al. | 713/1 |
| 2002/0170050 A1 * | 11/2002 | Fiorella et al. | 717/168 |
| 2003/0088868 A1 * | 5/2003 | Chang et al. | 717/173 |
| 2003/0154471 A1 * | 8/2003 | Teachman et al. | 717/171 |
| 2003/0188173 A1 * | 10/2003 | Zimmer et al. | 713/189 |
| 2003/0221092 A1 * | 11/2003 | Ballard et al. | 713/1 |
| 2004/0015952 A1 * | 1/2004 | Lajoie et al. | 717/171 |
| 2006/0031666 A1 * | 2/2006 | Yasuda | 713/2 |
| 2006/0048146 A1 * | 3/2006 | Oh | 717/178 |
| 2006/0282833 A1 * | 12/2006 | Choe | 717/171 |
| 2008/0040713 A1 * | 2/2008 | Subbakrishna et al. | 717/173 |

OTHER PUBLICATIONS

Search Report Dated Aug. 6, 2008.

* cited by examiner

ROBUST FIRMWARE UPGRADE IN A NETWORK TERMINAL

This application claims the benefit, under 35 U.S.C. §365 of International Application PCT/EP2008/056190, filed May 20, 2008, which was published in accordance with PCT Article 21(2) on Nov. 27, 2008 in English and which claims the benefit of European patent application No. 07447033.7, filed May 21, 2007.

The present invention relates generally to a method for remote firmware upgrade and in particular to a robust and transparent method.

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Customer Premises Equipment, noted CPE, and in particular Digital Subscriber Line gateways, noted DSL gateways, comprise interfaces to the Wide Area network, noted WAN. The CPE is manageable from a central management platform located on the WAN.

The DSL Forum Technical Report, TR-069 Amendment 1, CPE WAN Management Protocol, dated November 2006, noted TR-069, defines a detailed description of the management protocol in use for DSL Gateways. A remote SW upgrade that can be triggered and executed through the remote central management platform. A well known method for firmware upgrade uses a dual flash memory architecture. The firmware embedded in a gateway is persistently stored on a flash memory. If the capacity of the flash memory is large enough, i.e. more than twice the size required to store a firmware image, a dual bank flash architecture can be used. Within a dual bank flash, the memory is split into two separate memory areas. During a remote upgrade, one bank is active and supports all services, whereas the new firmware is downloaded onto the second bank. When the download is complete, the gateway can switch from one bank with the old firmware to the other bank with the new firmware. This method is robust, the old firmware remains available. This allows for recovery when the new firmware is corrupted. The service interruption is also minimized, the reboot with the new firmware being quite fast. The main drawback of this architecture is the cost of two flash memories.

Some methods implement a firmware upgrade with a single flash memory. The main drawback of these methods is the significant service interruption and the fact that robustness is not fully guaranteed. During the critical period of writing the new firmware to the flash memory, the old firmware that was stored in the flash memory is erased, and there is no fall back possible anymore without end-user intervention.

It is desirable that such a remote software upgrade is as much as possible transparent to the end-user. The remote upgrade shall be robust; i.e. in case things go wrong, and a remote upgrade is unsuccessful, there shall be a fall-back scenario that requires as little end-user intervention as possible. The service interruption shall be minimized; i.e. ideally, the end-user could make use of all the services offered by the gateway during the complete remote upgrade.

The present invention concerns a system and a method a robust and transparent remote firmware upgrade.

To the end the invention relates to a method for upgrading a firmware in a network terminal comprising an interface to a network and a non volatile memory adapted to store only one version of the firmware, the firmware comprising a first firmware and a second firmware, the method comprising, at the terminal, the step of erasing the first firmware from the non volatile memory, downloading a rescue firmware to the non volatile memory from a server located on the network, the rescue firmware being adapted to allow the terminal to download the firmware from the server, rebooting the terminal with the second firmware and the rescue firmware, downloading a new version of the first and second firmware from the server to the non volatile memory, erasing the rescue firmware from the non volatile memory, and rebooting the terminal with the new version of the first and second firmware.

According to an embodiment, the rescue firmware comprises means for downloading a new version of the firmware from the server.

According to an embodiment, the rescue firmware comprises a networking stack software that allows access to the Internet.

According to an embodiment, the rescue firmware comprises a management protocol compliant to DSL Forum Technical Report TR-069.

According to an embodiment, the first firmware comprises services that are essential during the firmware upgrade and the second firmware comprises services that are not required during the firmware upgrade.

Another object of the invention is a network terminal comprising an interface to a network and a non volatile memory adapted to store only one version of a firmware. To this end, the terminal comprises means for downloading a firmware from a server located in the network and for recovering the firmware from the server, if the firmware upgrade fails.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The invention will be better understood and illustrated by means of the following embodiment and execution examples, in no way limitative, with reference to the appended figures on which:

Figure 2:
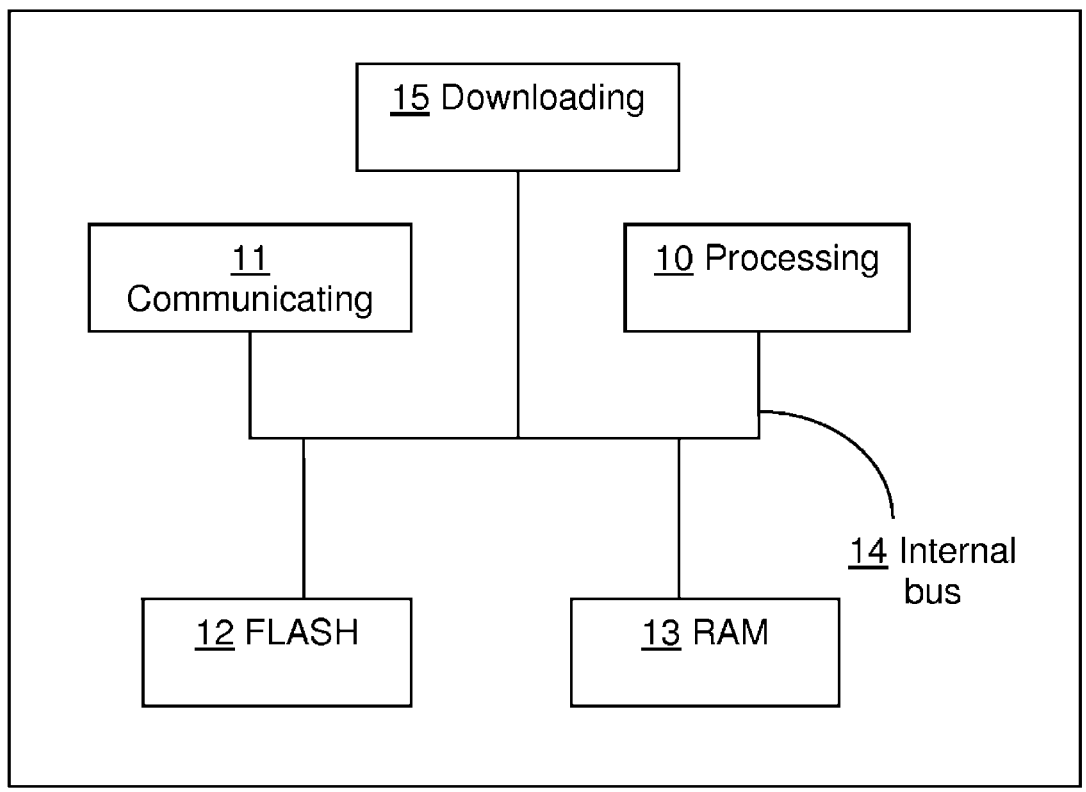
FIG. 2 is a block diagram of a terminal compliant with the embodiment.

In FIG. 2, the represented blocks are purely functional entities, which do not necessarily correspond to physically separate entities. Namely, they could be developed in the form of software or hardware, or be implemented in one or several integrated circuits.

The exemplary embodiment comes within the framework of a DSL network, but the invention is not limited to this particular environment and may be applied within other frameworks where a device connected to a network performs a firmware upgrade from another device located on the network. In particular, the invention is applicable to any broadband device, and to any cellular device.

Figure 1:
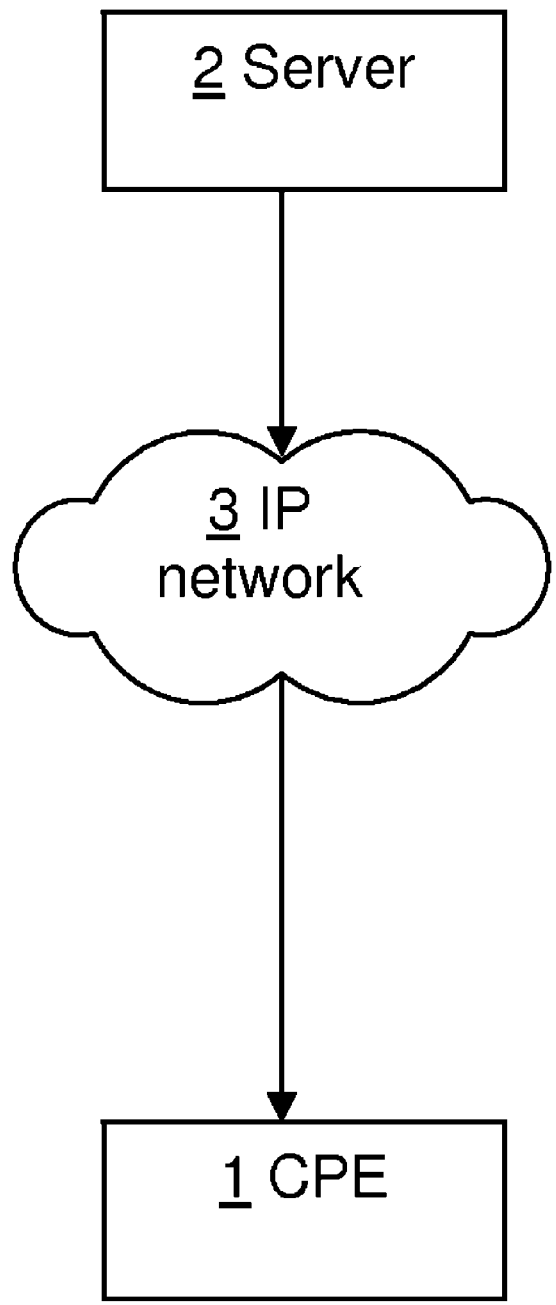
FIG. 1 is a block diagram of a system compliant with the embodiment.

FIG. 1 describes the system of the embodiment. It comprises a server where the new firmware is made available. It comprises a CPE that connects to the server through the Internet. Of course, the CPE could be connected through any broadband network to the server.

FIG. 2 depicts the main elements of the CPE according to the embodiment. It comprises a processing module 10, a communicating module that permits to communicate to the server located on the Internet. It also comprises a well known in the art flash memory 12 and a Random access memory, noted RAM 13. All the modules are interconnected through an internal bus 14. A flash memory is a non volatile memory. It retains the stored information even when not powered. The flash memory size is optimized in that the flash memory can store only one version of the firmware. The CPE also comprises a downloading module 15 for downloading firmware from a server, as described hereinafter. The downloading module also permits to have access to a version of an essential part of the firmware in case the upgrade fails. The CPE stores a version of that firmware in memory, or it stores a pointer to a firmware version available on the remote server. The downloading process is more detailed herein below.

The firmware is split into two parts that do not need to be of equal size. The first part comprises the Core Kernel and the Core File System. The second part comprises the Extended firmware.

The first part supports the services that are considered essential during the remote upgrade. The second part supports the services that can be suspended during a remote upgrade. The selection of services that can be suspended is configurable in the build system of the gateway.

The Core Kernel comprises files which are not required at run-time, once loaded at boot-up time. These files are the kernel and the kernel modules. The modules are stored in the separate file system, noted modfs. Nothing in the system keeps any references, such as open file descriptors, to the files stored in the modfs at run-time. It is then possible to overwrite the Core Kernel part with a new version without breaking the running applications. Of course this requires that the system doesn't try to load any new modules at that time; this can be avoided in a manner well known per se. In particular, the Core kernel comprises the vmlinux, a linked executable file that comprises the Linux kernel, and the modfs, which stores specific information on modules stored in the file.

The Core File System comprises the essential services, i.e. the root file system which is used at run-time, such as applications, libraries, and configuration files. The essential services are those usually found at the top of a product's feature list. They are those that an end user is mostly using.

The Extended firmware comprises additional services that are not essential to the end user. In the gateway, the Extended services comprise, and is not limited to, the USB support services that are intended to enable the attachment of a USB storage device, the Samba services that are intended to make a disk visible across local networks.

A Rescue firmware defines a light-weight piece of firmware which implements only the functionality of downloading new firmware that is available on the remote management server. The Rescue firmware comprises means for contacting a service provider's server and downloading the new firmware; the Rescue firmware comprises the networking stack software that allows access to the Internet. It supports a protocol understandable by the server, e.g. TR-069.

The flash memory size is adapted so that the Rescue firmware fits in the flash memory when the Extended firmware is erased from the flash memory.

Figure 3:
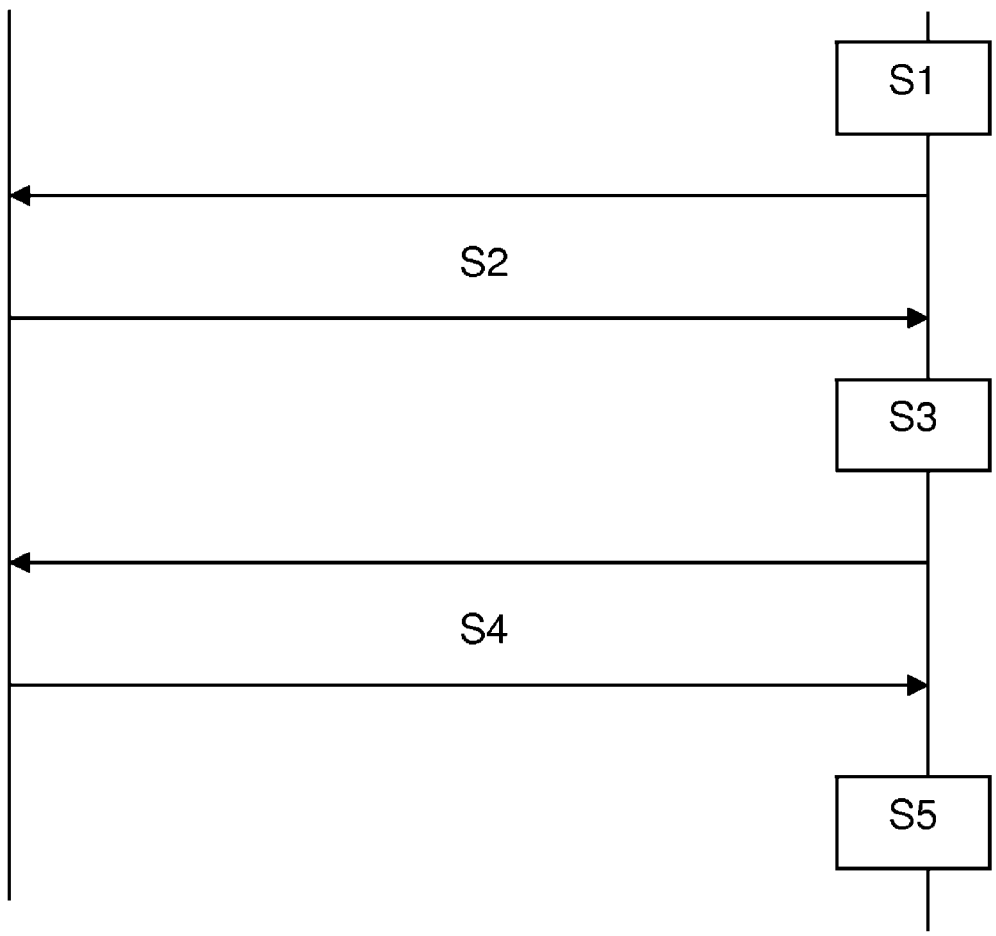
FIG. 3 is a flow chart of the firmware upgrade according to the first embodiment.

As shown in FIG. 3, the Extended firmware is erased from the flash memory and RAM, Step S1, after which the Rescue firmware is downloaded, S2. The Rescue firmware is loaded to the flash memory, and the CPE reboots with the Rescue firmware, S3. Next, the Core and the Extended firmware are downloaded to the RAM, S4. The Core is loaded to the flash memory, Rescue firmware is erased from the flash memory, Extended firmware is loaded to the flash memory, and the CPE reboots, Step S5.

According to the method indicated in FIG. 3, the original Core is still present if the Rescue firmware on the flash memory is corrupted. And the Rescue firmware is available in case the new Core firmware is corrupted. As such, the system can always recover without any end user intervention.

According to this first embodiment, no services are available to the end user between the steps S3 and S5 included. The second embodiment addresses this issue, and reduces the period when the services are not available. In the second embodiment, the Core firmware is split into two parts; a Core Kernel, and a Core File System. They are downloaded and written to the flash memory sequentially. The Core Kernel comprises the kernel and the modules files. Once they are loaded in the RAM at boot time, they are not required in the flash memory at run-time. The Core Kernel can be overwritten in the flash memory without breaking the running applications. The Core File System comprises the root file system which is used at run-time.

Figure 4:
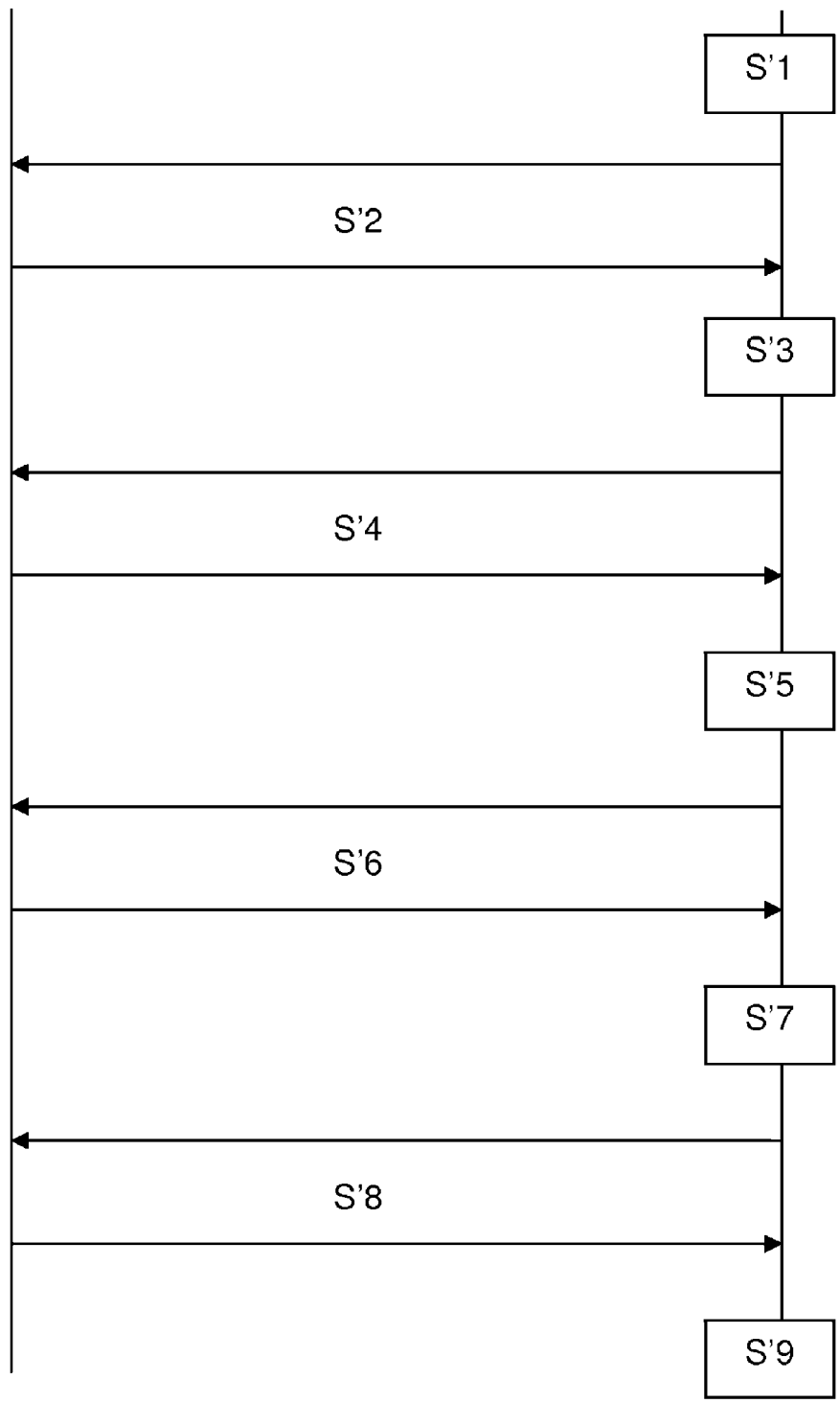
FIG. 4 is a flow chart of the firmware upgrade according to the second embodiment.

As indicated in FIG. 4, the firmware upgrade is performed as follows. The Extended firmware is erased from the flash memory and the RAM, step S'1. The Rescue firmware is downloaded, step S'2, and loaded to the flash memory, step S'3. The core kernel is erased from the flash memory. The new core kernel is downloaded, step S'4, and flashed, step S'5. The new Core File System is downloaded and its integrity is verified, step S'6.

At step S'7, the CPE reboot with the new Core Kernel and Core File System is performed as follows:
  a pivot-application is built in the RAM; i.e. a small root file system is made, noted tmpfs;
  all services are closed and the pivot-application is started from the RAM. It is independent from the root file system in the flash memory;
  the pivot-application erases the Core File System from the flash memory, and replaces it by the new Core File System;
  then the CPE reboots, and starts up from the new Core Kernel and the new Core File System.

The Extended firmware is then downloaded, step S'8, and written in the flash memory, Step S'9. No services are available to the end user during the step S'7. This time is much shorter than the service interruption time of the first embodiment.

Figure 5:
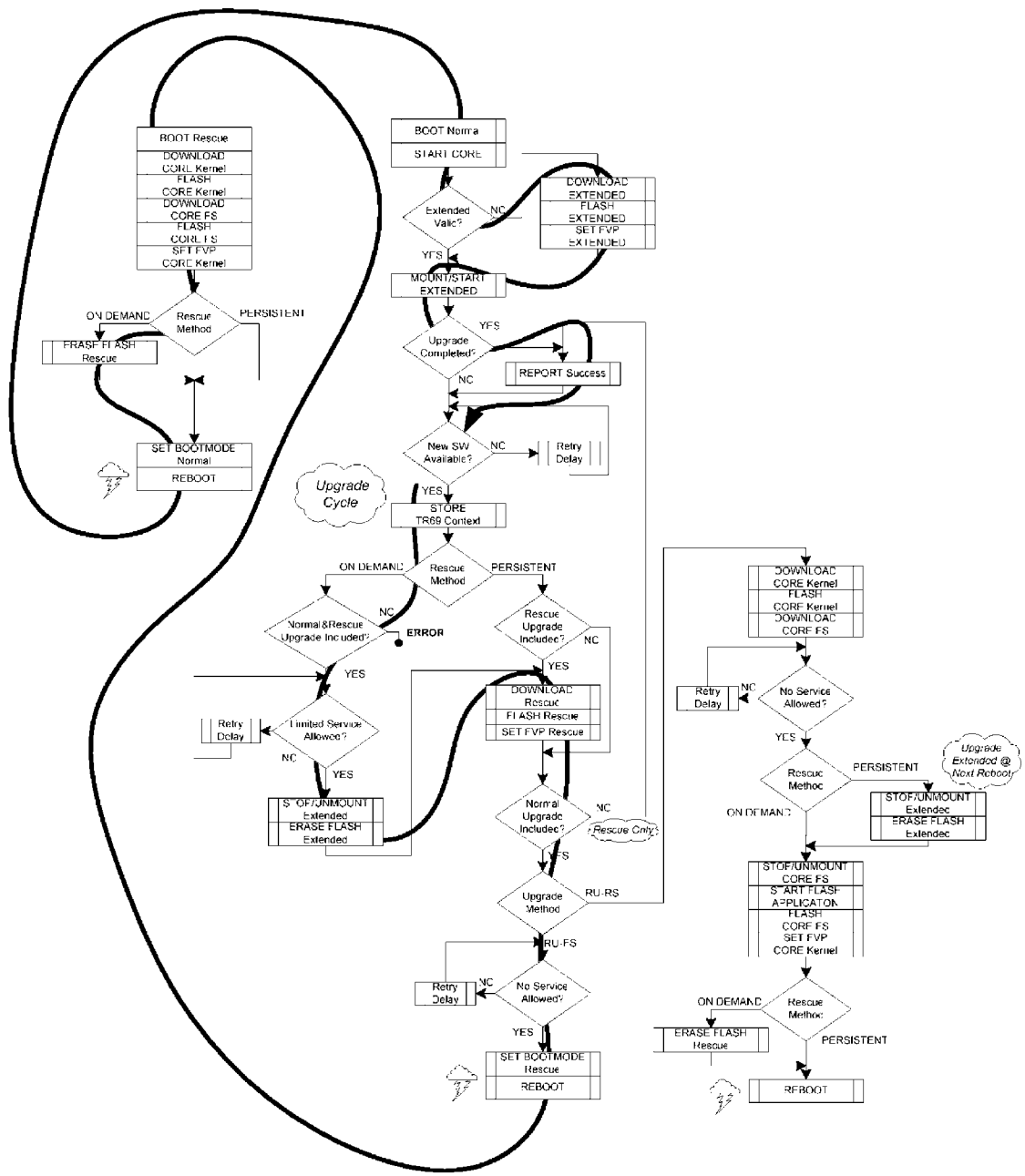
FIG. 5 is another flow chart of the firmware upgrade.

The firmware upgrade is also represented on FIG. 5.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A method for upgrading a firmware in a network terminal comprising an interface to a network and a non-volatile memory adapted to store only one version of the firmware, wherein the firmware comprises a core firmware comprising essential network terminal services and an extended firmware comprising non-essential network terminal services, wherein the non-essential network terminal services are being suspended during the firmware upgrade in the network terminal, and wherein the method comprising, implemented at the network terminal, the steps of:

erasing the extended firmware from the non-volatile memory;

downloading a rescue firmware to the non-volatile memory from a server located on the network, wherein the rescue firmware is being adapted to allow the network terminal to download firmware from the server;

rebooting the network terminal with the core firmware and the rescue firmware;

downloading a new version of the core firmware and a new version of the extended firmware from the server to the non-volatile memory;

erasing the rescue firmware from the non-volatile memory; and rebooting the network terminal with the new version of the core firmware and the new version of the extended firmware.

2. The method according to claim 1, wherein the rescue firmware comprises means for downloading a new version of the firmware from the server.

3. The method according to claim 1, wherein the rescue firmware comprises a networking stack software that allows access to the Internet.

4. The method according to claim 1, wherein the rescue firmware comprises a management protocol compliant to DSL Forum Technical Report TR-069.

5. A method for upgrading a firmware in a network terminal comprising an interface to a network and a non-volatile memory adapted to store only one version of the firmware, wherein the firmware comprises a core firmware comprising essential network terminal services and an extended firmware comprising non-essential network terminal services, wherein the non-essential network terminal services are being suspended during the firmware upgrade in the network terminal, wherein the core firmware comprises a core kernel comprising files not required at run-time once the files are loaded at boot time, and a core file system comprising the essential network terminal services, and wherein the method comprising, implemented at the network terminal, the steps of:

erasing the extended firmware from the non-volatile memory;

downloading a rescue firmware to the non-volatile memory from a server located on the network, wherein the rescue firmware is being adapted to allow the network terminal to download firmware from the server;

erasing the core kernel from the non-volatile memory;

downloading a new version of the core kernel to the non-volatile memory;

downloading a new version of the core file system to the non-volatile memory;

rebooting the network terminal with the new version of the core kernel, the new version of the core file system, and the rescue firmware; and downloading a new version of the extended firmware from the server to the non-volatile memory.

6. A network terminal comprising an interface to a network and a non-volatile memory adapted to store only one version of a firmware, wherein the firmware comprises a core firmware comprising essential network terminal services and an extended firmware comprising non-essential network terminal services, wherein the non-essential network terminal services are being suspended during a firmware upgrade in the network terminal, and wherein the network terminal further comprising:

downloading means for erasing the extended firmware from the non-volatile memory, downloading a rescue firmware to the non-volatile memory from a server located on the network, wherein the rescue firmware is being adapted to allow the network terminal to download firmware from the server, rebooting the network terminal with the core firmware and the rescue firmware, downloading a new version of the core firmware and a new version of the extended firmware from the server to the non-volatile memory, erasing the rescue firmware from the non-volatile memory, and rebooting the network terminal with the new version of the core firmware and the new version of the extended firmware.

7. A network terminal according to claim 6, further comprising means for configuring a list of essential and non-essential network terminal services.

8. A network terminal comprising an interface to a network and a non-volatile memory adapted to store only one version of a firmware, wherein the firmware comprises a core firmware comprising essential network terminal services and an extended firmware comprising non-essential network terminal services, wherein the non-essential network terminal services are being suspended during a firmware upgrade in the network terminal, wherein the core firmware comprises a core kernel comprising files not required at run-time once the files are loaded at boot time, and a core file system comprising the essential network terminal services, and wherein the network terminal further comprising:

downloading means for erasing the extended firmware from the non-volatile memory, downloading a rescue firmware to the non-volatile memory from a server located on the network, wherein the rescue firmware is being adapted to allow the network terminal to download firmware from the server, erasing the core kernel from the non-volatile memory, downloading a new version of the core kernel to the non-volatile memory, downloading a new version of the core file system to the non-volatile memory, rebooting the terminal with the new version of core kernel, the new version of core file system, and the rescue firmware, and downloading a new version of the extended firmware from the server to the non-volatile memory.

\* \* \* \* \*